(12) United States Patent
Wu

(10) Patent No.: US 12,411,635 B2
(45) Date of Patent: Sep. 9, 2025

(54) PARTITIONS WITHIN BUFFER MEMORY

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/523,412

(22) Filed: Nov. 29, 2023

(65) Prior Publication Data

US 2024/0176536 A1 May 30, 2024

Related U.S. Application Data

(60) Provisional application No. 63/428,990, filed on Nov. 30, 2022.

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ...... G06F 3/0604; G06F 3/061; G06F 3/0644; G06F 3/0656; G06F 3/0679
See application file for complete search history.

(56) References Cited

U.S. PATENT DOCUMENTS

| | | | |
|---|---|---|---|
| 8,849,104 B2 | 9/2014 | Eder | |
| 10,274,948 B2 | 4/2019 | Penilla et al. | |
| 2003/0023826 A1* | 1/2003 | McMichael | G06F 3/0601 711/112 |
| 2003/0056058 A1* | 3/2003 | Veitch | G06F 3/0647 711/6 |
| 2012/0014659 A1 | 1/2012 | Hugosson | |
| 2016/0268000 A1 | 9/2016 | Thompson et al. | |
| 2017/0372431 A1 | 12/2017 | Perl | |
| 2018/0081543 A1 | 3/2018 | Muchherla et al. | |
| 2018/0131677 A1* | 5/2018 | Brickell | H04L 9/3247 |
| 2020/0135270 A1 | 4/2020 | Lee et al. | |
| 2020/0235942 A1 | 7/2020 | Strong et al. | |
| 2020/0242021 A1 | 7/2020 | Gholamiour et al. | |
| 2020/0250901 A1* | 8/2020 | Golov | B60R 21/0134 |
| 2020/0257296 A1 | 8/2020 | Liu et al. | |
| 2022/0317918 A1* | 10/2022 | Golov | G06F 3/0655 |

FOREIGN PATENT DOCUMENTS

KR 20190041023 A 4/2019

* cited by examiner

*Primary Examiner* — Larry T Mackall
(74) *Attorney, Agent, or Firm* — Brooks, Cameron & Huebsch, PLLC

(57) ABSTRACT

Partitions within buffer memory, such as may be used as a cyclic buffer for caching or storage of time based telemetric sensor data, can be operated with different programming characteristics to provide a balance between total memory sub-system capacity and endurance. Received first time based telemetric sensor data can be written to one or more partitions or sub-partitions with different programming characteristics. One programming characteristic can provide a lesser data density and greater data endurance than another programming characteristic. The programming characteristic can be data density per memory cell. The different partitions or sub-partitions can be written to randomly, with equal probability, or another metric.

23 Claims, 7 Drawing Sheets

PARTITIONS WITHIN BUFFER MEMORY

PRIORITY INFORMATION

This application claims the benefit of U.S. Provisional Application No. 63/428,990, filed on Nov. 30, 2022, the contents of which are incorporated herein by reference.

TECHNICAL FIELD

The present disclosure relates generally to semiconductor memory and methods, and more particularly, to apparatuses, systems, and methods for partitions within buffer memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
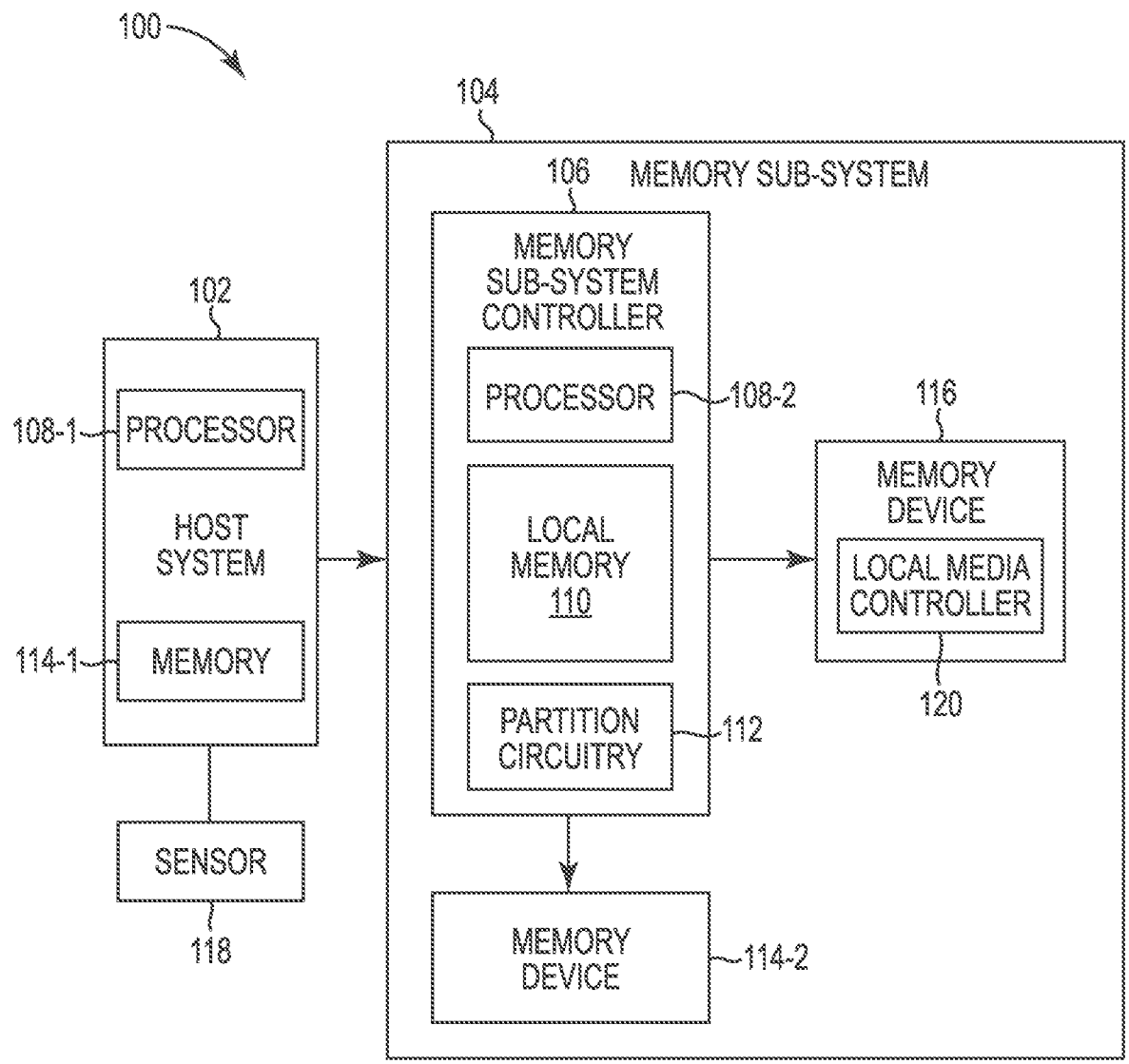
FIG. 1 is a block diagram of an example computing system that includes a memory sub-system in accordance with some embodiments of the present disclosure.

Aspects of the present disclosure are directed to partitions within buffer memory for a vehicle memory sub-system. A vehicle can include a memory sub-system, such as a solid state drive (SSD). The memory sub-system can be used for storage of data by applications that are run by a host system of the vehicle. Examples of such an application include a black box of the vehicle, a telemetry system of the vehicle, and an infotainment system of the vehicle. The memory sub-systems used to store the data associated with such applications in vehicles may be derived from memory systems used in mobile devices such as mobile phones, laptops, tablets, etc. However, there are significant differences in the usage patterns of memory sub-systems associated mobile devices and vehicles. For example, vehicles may be subjected to a wider temperature range than mobile devices, which requires better cross-temperature features for the memory sub-system. Also, the memory sub-systems associated with vehicles may be expected to have a longer lifetime (e.g., 10 years instead of three years), which produces an increased expectancy for endurance and retention. Furthermore, vehicle systems are becoming more complex, such as by using virtualization technology to integrate vehicle applications into a single system, producing an expectation for higher performance and lower access latency for the memory sub-system. Most mobile systems are always (or almost always) on with frequent idle time (e.g., when the user doesn't touch the screen) allowing the memory sub-system to perform internal management operations. In contrast, vehicles are frequently powered off and while on, are rarely in an idle status.

One difficulty associated with sudden power loss for vehicle memory sub-systems is the potential loss of sensor data (e.g., associated with a black box application). The sensor data can be time based telemetric sensor data and may normally be buffered (e.g., in a cyclic buffer) in volatile memory before being stored in non-volatile memory. When an event (e.g., an accident) occurs, the time based telemetric sensor data is flushed to the non-volatile memory. However, data stored in volatile memory may be lost in the event of a power loss. Therefore, some approaches include the use of backup power supplies to allow for flushing the time based telemetric sensor data from volatile memory to non-volatile memory.

Various applications may use the automotive SSD, which can make efficient operation of the storage volume provided by the SSD more complicated. There are many different data types to be stored in the automotive SSD, such as boot data, operating system image data, map data, time based telemetric sensor data, personal contact data, multimedia data, etc. Different applications and different data types are associated with different write sizes and frequencies. In some automotive SSD examples, the time based telemetric sensor data that is cached or stored in cyclic buffers and/or snapshot portions may be one or more orders of magnitude larger than any other write size per unit time. Data can be stored at different data densities per memory cell in the automotive SSD, however there are tradeoffs between the data density and endurance that should be balanced against a desired specification for the automotive SSD.

Aspects of the present disclosure address the above and other deficiencies by providing a memory sub-system for vehicles that stores time based telemetric sensor data at varying data densities in one or more cyclic buffer partitions of the memory sub-system. This advantageously provides a balance (e.g., a tuned balance) between endurance and total density requirements.

The figures herein follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2. Analogous elements within a Figure may be referenced with a hyphen and extra numeral or letter. Such analogous elements may be generally referenced without the hyphen and extra numeral or letter. For example, elements 108-1 and 108-2 in FIG. 1 may be collectively referenced as 108. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an example computing system 100 that includes a memory sub-system 104 in accordance with some embodiments of the present disclosure. The memory sub-system 104 can include media, such as one or more volatile memory devices 114-2, one or more non-volatile memory devices 116, or a combination thereof. The volatile memory devices 114-1, 114-2 illustrated in FIG. 1 can be, but are not limited to, random access memory (RAM), such as dynamic random access memory (DRAM), synchronous dynamic random access memory (SDRAM), and resistive DRAM (RDRAM). The memory sub-system 104 can also include additional circuitry or components that are not illustrated. In some embodiments, the memory sub-system 104 can include address circuitry (e.g., a row decoder and a column decoder) that can receive an address from the memory sub-system controller 106 and decode the address to access the non-volatile memory devices 116.

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). In at least one embodiment, the memory sub-system 104 is an automotive grade SSD. Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes a host system 102 that is coupled to one or more memory sub-systems 104. In some embodiments, the host system 102 is coupled to different types of memory sub-systems 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 includes or is coupled to processing resources, memory resources, and network resources. As used herein, "resources" are physical or virtual components that have a finite availability within a computing system 100. For example, the processing resources include a processor 108-1 (or a number of processing devices), the memory resources include volatile memory 114-1 for primary storage, and the network resources include as a network interface (not specifically illustrated). The processor 108-1 can be one or more processor chipsets, which can execute a software stack. The processor 108-1 can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be configured to provide virtualized or non-virtualized access to the memory sub-system 104 and/or the processing resources and network resources. Virtualization can include abstraction, pooling, and automation of the processing, memory, and/or network resources. To provide such virtualization, the host system 102 can incorporates a virtualization layer (e.g., hypervisor, virtual machine monitor, etc.) that can execute a number of virtual computing instances (VCIs). The virtualization layer 108 can provision the VCIs with processing resources and memory resources and can facilitate communication for the VCIs via the network interface. The virtualization layer represents an executed instance of software run by the host system 102. The term "virtual computing instance" covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated application instances may also be referred to as VCIs. The term "VCI" covers these examples and combinations of different types of VCIs, among others.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory devices 116 when the memory sub-system 104 is coupled with the host system 102 by the PCIe interface. The physical host interface can provide an interface for passing control, address, data, and other signals between the memory sub-system 104 and the host system 102. In general, the host system 102 can access multiple memory sub-systems via a same communication connection, multiple separate communication connections, and/or a combination of communication connections.

The non-volatile memory devices 116 can be not-and (NAND) type flash memory. NAND type flash memory includes, for example, two-dimensional NAND (2D NAND) and three-dimensional NAND (3D NAND). The non-volatile memory devices 116 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 116 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 116 can be grouped as pages that can refer to a logical unit of the memory device used to store data. With some types of memory (e.g., NAND), pages can be grouped to form blocks.

The memory sub-system controller 106 (or controller 106 for simplicity) can communicate with the non-volatile memory devices 116 to perform operations such as reading data, writing data, erasing data, and other such operations at the non-volatile memory devices 116. The memory sub-system controller 106 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processor 108-2 configured to execute instructions stored in local memory 110. The local memory 110 of the memory sub-system controller 106 can be an embedded memory configured to store instructions for performing various processes, operations, logic flows, and routines that control operation of the memory sub-system 104, including handling communications between the memory sub-system 104 and the host system 102. The local memory 110 can be volatile memory, such as static random access memory (SRAM).

In some embodiments, the local memory 110 can include memory registers storing memory pointers, fetched data, etc. The local memory 110 can also include ROM for storing micro-code, for example. While the example memory sub-system 104 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive information or operations from the host system 102 and can convert the information or operations into instructions or appropriate information to achieve the desired access to the non-volatile memory devices 116 and/or the volatile memory devices 110, 114-2. The memory sub-system controller 106 can be responsible for other operations such as media management operations (e.g., wear leveling operations, garbage collection operations, defragmentation operations, read refresh operations, etc.), error detection and/or correction operations, encryption operations, caching operations, and address translations between a logical address (e.g., logical block address) and a physical address (e.g., physical block address) associated with the non-volatile memory devices 116. The memory sub-system controller 106 can use error correction code (ECC) circuitry to provide the error correction and/or error detection functionality. The ECC circuitry can encode data by adding redundant bits to the data. The ECC circuitry can decode error encoded data by examining the ECC encoded data to check for any errors in the data. In general, the ECC circuitry can not only detect the error but also can correct a subset of the errors it is able to detect. The memory sub-system controller 106 can further include host interface circuitry to communicate with the host system 102 via the physical host interface. The host interface circuitry can convert a query received from the host system 102 into a command to access the non-volatile memory devices 116 and/or the volatile memory device 114-2 as well as convert responses associated with the non-volatile memory devices 116 and/or the volatile memory device 114-2 into information for the host system 102.

In some embodiments, the non-volatile memory devices 116 include a local media controller 120 that operates in conjunction with memory sub-system controller 106 to execute operations on one or more memory cells of the memory devices 116. An external controller (e.g., memory sub-system controller 106) can externally manage the non-volatile memory device 116 (e.g., perform media management operations on the memory device 116). In some embodiments, a memory device 116 is a managed memory device, which is a raw memory device combined with a local controller (e.g., local controller 120) for media management within the same memory device package. An example of a managed memory device is a managed NAND device.

The host system 102 can send requests to the memory sub-system 104, for example, to store data in the memory sub-system 104 or to read data from the memory sub-system 104. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

Time based telemetric sensor data can be received from one or more sensors 118 coupled to the host system 102. The sensors 118 are described in more detail with respect to FIG. 3. In some examples, the time based telemetric sensor data can be buffered in the host memory 114-1, in the local memory 110 of the memory controller 106, in the volatile memory 114-2 of the memory sub-system 104. In some examples, the time based telemetric sensor data can be buffered in a cyclic buffer in the non-volatile memory 116. In some embodiments, the non-volatile memory 116 can be partitioned (e.g., by partition circuitry 112) to provide for storage of different data types (e.g., multimedia data, user data, navigation data, operating system data, time based telemetric sensor data, etc.) in different partitions. Furthermore, a partition used to provide a cyclic buffer for storage of time based telemetric sensor data can be split into sub-partitions or into different partitions represented as a single logical volume so that the time based telemetric sensor data can be programmed thereto with different programming characteristics.

The host 102 can receive data from one or more sensors 118 and store the data in the memory sub-system 104. The data from various sensors sums up to a substantial throughput requirement per unit time (e.g., 1 gigabyte per second (GB/sec) sequential write throughput from a host). That time based telemetric sensor data can be buffered in the cyclic buffer partition of the non-volatile memory 116, where the storage capacity provided by the cyclic buffer partition is filled and written over as necessary to buffer the most recently received time based telemetric sensor data. Upon an event, a quantity (e.g., thirty seconds) of playback time immediately preceding an event needs to be captured to determine the cause of an incident. A playback may be referred to as a "snapshot". Snapshots or other portions of the time based telemetric sensor data that are desired to be persisted may be stored in a snapshot partition. The snapshot partition is not automatically written over, unlike the cyclic buffer partition so that a more considered approach is taken to determining when that data may be discarded. The application that controls storage of such information is referred to herein as a black box.

Figure 2A:
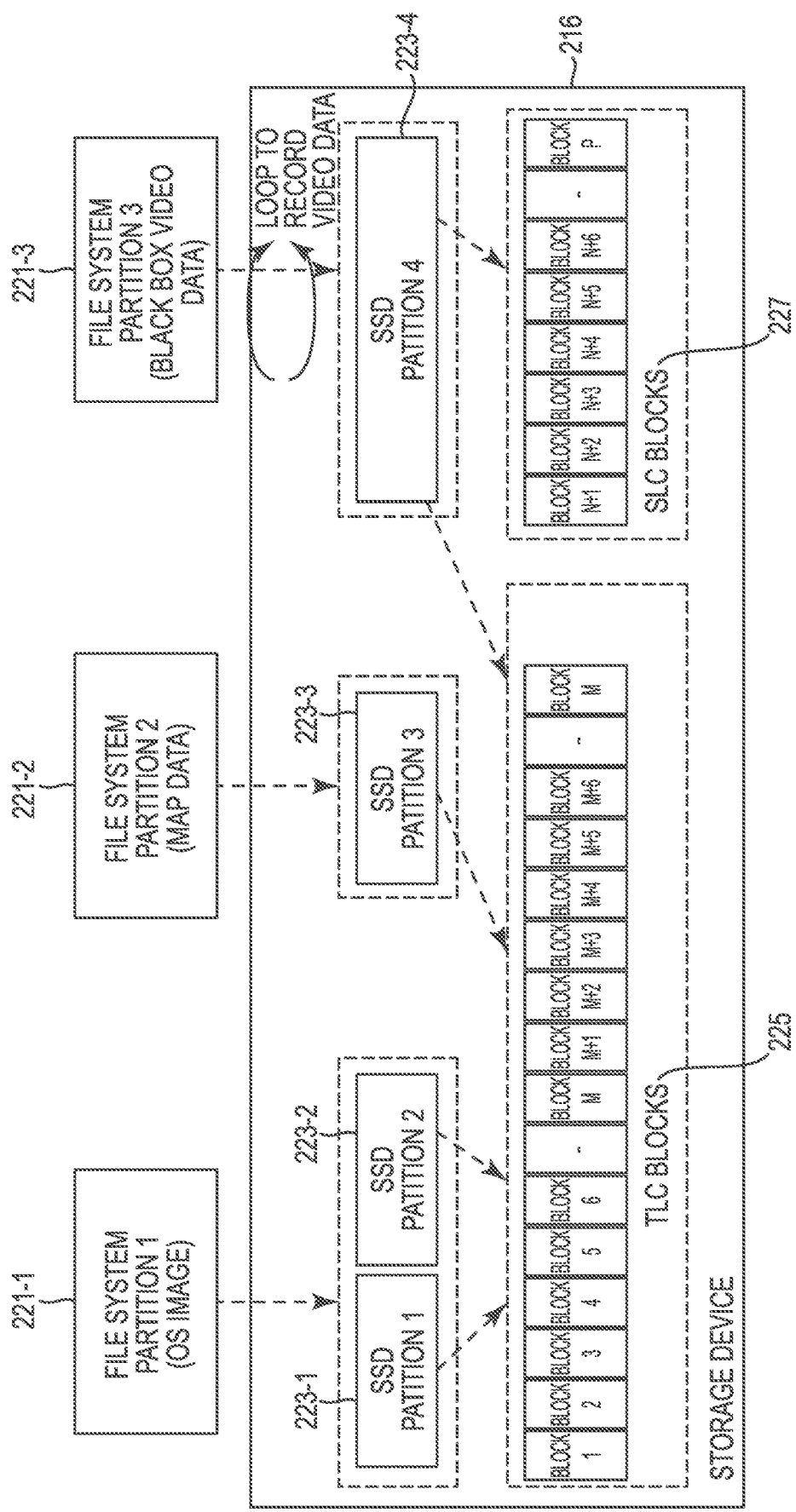
FIG. 2A is a block diagram of partitions within memory in accordance with some embodiments of the present disclosure.

FIG. 2A is a block diagram of partitions within memory in accordance with some embodiments of the present disclosure. The storage device 216 is analogous to the non-volatile memory 116 illustrated in FIG. 1, with additional detail shown. The file system partitions 221 represent partitions of a file system, which may be managed by a host (e.g., the host 102 illustrated in FIG. 1). An example of the file system is the Linux file system. As a non-limiting example, three file system partitions 221 are illustrated. An example of the first file system partition 221-1 is an operating system (OS) image. An example of the second file system partition 221-2 is a map data partition. An example of the third file system partition 221-3 is a black box video data partition. Black box video data is one example of time based telemetric sensor data.

The memory volume provided by the non-volatile memory device 216 can be split into different partitions 223, and may be referred to as memory partitions 223 to distinguish from the file system partitions 221. Each file system partition 221 corresponds to at least one memory partition 223. As used herein, the correspondence between a file system partition 221 and memory partition 223 means that the file system partition 221 has access to the memory partition 223 for storage of data. For example, the first file system partition 221-1 corresponds to a first memory partition 223-1 and a second memory partition 223-2. Both memory partitions 223-1, 223-2 may represent a single volume of memory accessible to the first file system partition 221-1 as indicated by the dashed box around the first memory partition 223-1 and the second memory partition 223-2. As other examples, the second file system partition 221-2 corresponds to the third memory partition 223-3 and the third file system partition 221-3 corresponds to the fourth memory partition 223-4.

Figure 2B:
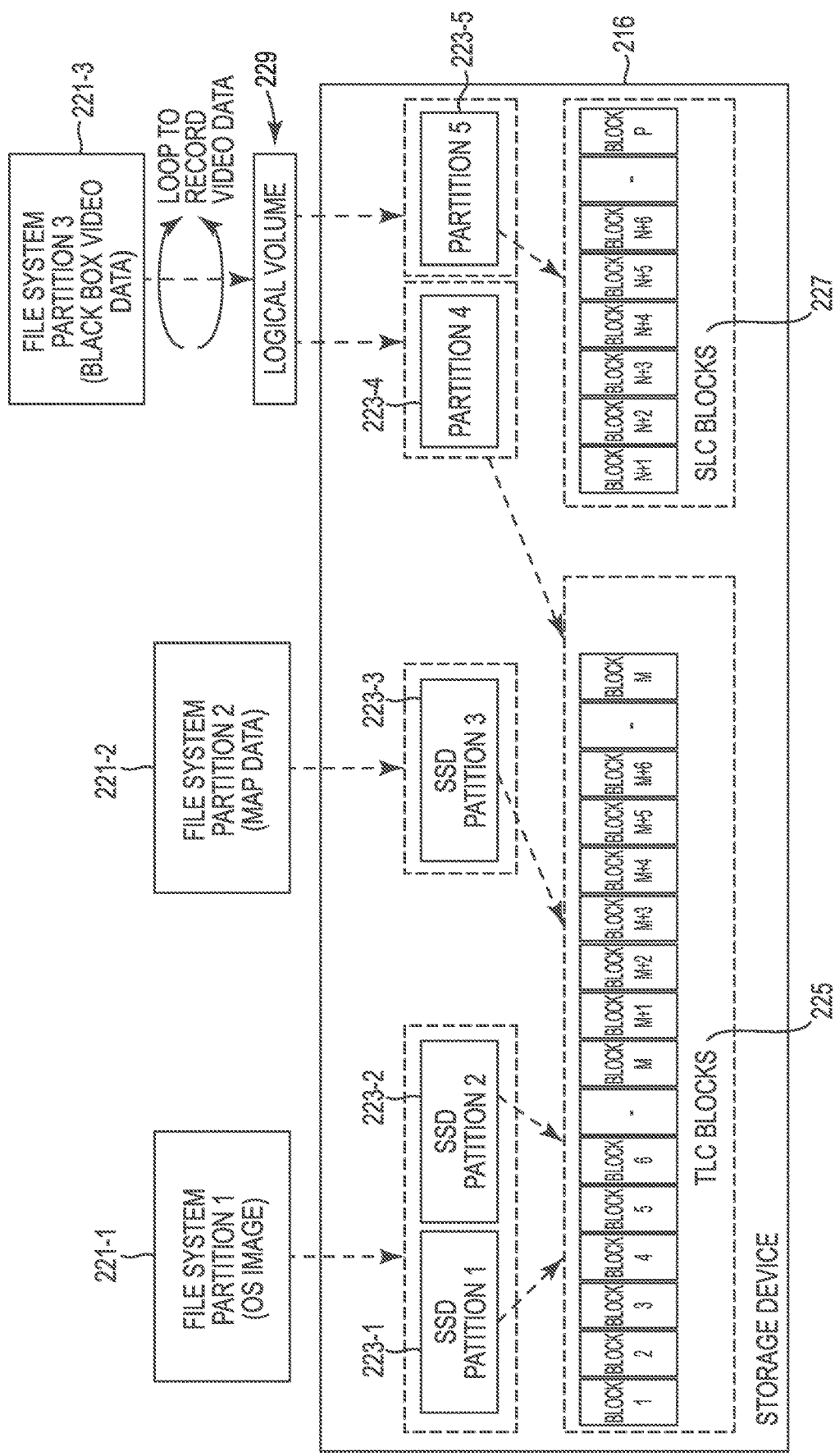
FIG. 2B is a block diagram of partitions within memory in accordance with some embodiments of the present disclosure.

There is not necessarily a one-to-one correspondence between the memory partitions 223 and the physical memory blocks that they represent. Instead, the memory partitions 223 can define an amount or a limit on the amount of physical memory blocks that are allocated thereto (e.g., the fourth memory partition 223-4 could be 40 GB). In FIG. 2A and FIG. 2B, the physical memory is represented by memory blocks 225, 227. The first memory blocks 225, in this example, are operated with a first programming characteristic (e.g., TLC programming) and the second memory blocks 227 are operated with a second programming characteristic (e.g., SLC programming). Embodiments are not limited to these specific examples of programming characteristics or bits per cell. There is not necessarily a physical difference between the memory cells in the different blocks 225, 227. The difference exists in how they are programmed. As illustrated, the memory partitions 223-1, 223-2, 223-3 correspond to the TLC blocks 225 as indicated by the arrows therebetween. The memory partition 223-4 corresponds to the TLC blocks 225 and the SLC blocks 227 as indicated by the arrow therebetween. The first programming characteristic can provide a greater data density and a lesser data endurance than the second programming characteristic.

As illustrated, the third file system partition 221-3 uses the fourth memory partition 223-4 to store video data in a recorded loop, where the newest video data replaces the oldest video data in the fourth memory partition 223-4 after the capacity of the fourth memory partition 223-4 has been used by the third file system partition 221-3. The fourth memory partition 223-4 is split into two sub partitions 219-1, 219-2. However, the host or file system may not be aware that the two sub-partitions 219-1, 219-2 of the fourth memory partition 223-4 exist. The fourth memory partition 223-4 can represent a single volume of memory as indicated by the dashed lines around the fourth partition 223-4. The fourth memory partition 223-4 can be referred to as a cyclic buffer partition. The memory controller (e.g., memory controller 106 in FIG. 1, but not specifically illustrated in FIG. 2A and FIG. 2B) can be responsible for operating the sub-partitions 219, which may not be presented as such to the host or file system.

The first sub-partition 291-1 corresponds to the TLC blocks 225. The second sub-partition 219-2 corresponds to the SLC blocks 227. Thus, any data written to the first sub-partition 219-1 can be programmed with the programming characteristic associated with the first memory blocks 225 and any data written to the second sub-partition 219-2 can be programmed with the programming characteristic associated with the second memory blocks 227.

The memory controller can allocate a first quantity of memory blocks 225 of the cyclic buffer partition 223-4 as the first sub-partition 219-1. Again, this quantity of memory blocks does not mean that individual physical memory blocks are allocated, but that the capacity of memory they represent is allocated. The memory controller can allocate a second quantity of memory blocks 227 of the cyclic buffer partition 223-4 as the second sub-partition 219-2. The memory controller can therefore determine how much physical memory is allocated to each sub-partition 219. The memory controller can write first time based telemetric sensor data to the first sub-partition 219-1 with a first programming characteristic and write second time based telemetric sensor data to the second sub-partition 219-2 with the second programming characteristic. The memory controller can write other received data to the first memory partition 223-1, the second memory partition 223-2, the third partition 223-3, and/or other memory partitions corresponding to the fist memory blocks 225 with the first programming characteristic.

Time based telemetric sensor data received from the host (e.g., in association with the black box file system partition 221-1) is not targeted for a particular sub-partition 219-1, 219-2. In some embodiments, the memory controller can be configured to write received time based telemetric sensor data to either sub-partition 219-1, 219-2 with equal probability. In some embodiments, the memory controller can be programmed with a bias toward one sub-partition 219 over another such that the time based telemetric sensor data is more likely to be written to one sub-partition 219 over another.

FIG. 2B is a block diagram of partitions within memory in accordance with some embodiments of the present disclosure. FIG. 2B is largely analogous to FIG. 2A except that the cyclic buffer partition 223-4 in FIG. 2A is provided by two different memory partitions 223-4, 223-5 in FIG. 2B. The two different memory partitions 223-4, 223-5 can be presented as a single logical volume 229 to the host and/or to the black box file system partition 221-3. In this example, the memory system partition 223-4 corresponds to the TLC blocks 225 and the memory system partition 223-5 corresponds to the SLC blocks 227. Thus, the memory controller would write received time based telemetric sensor data associated with the memory partition 223-4 to the TLC blocks 225 and would write time based telemetric sensor data associated with the memory partition 223-5 to the SLC blocks 227. However, because the two memory partitions 223-4, 223-5 are presented as a single logical volume 229, the host and/or black box file system partition 221-3 do not direct to which memory partition 223-4, 223-5 the data goes (and thus do not direct with which programming characteristic the data is programmed).

The memory controller can be configured to write received first data to the first memory partition 223-1 with the first programming characteristic, write received second data to the second memory partition 223-2 with the first programming characteristic, write received third data to the third memory partition 223-3 with the first programming characteristic, and/or write received first time based telemetric sensor data to the memory partition 223-4 with the first programming characteristic. The memory controller can be configured to write received second time based telemetric sensor data to the memory partition 223-5 with the second programming characteristic. The second programming characteristic can provide lesser data density and greater data endurance than the first programming characteristic. In some embodiments, the memory controller can be configured to write the time based telemetric sensor data to the memory partition 223-4 or to the memory partition 223-5 with equal probability.

An alternative s approach would be to use the first programming characteristic (e.g., TLC programming) for all of the data sent to the non-volatile memory device 216. However, the endurance provided by such a programming characteristic may not be sufficient to meet the desired endurance for certain data types, such as time based telemetric sensor data. Another alternative approach would be to use the second programming characteristic (e.g., SLC programming) for the data types for which endurance is a concern. However, the total data capacity provided by that approach may not be sufficient for the non-volatile memory device 216 to meet a customer's requirements. For example, assume a customer requires at least 210 GB of storage from the non-volatile memory device 216. If the total data capacity of the non-volatile memory device 216, assuming TLC programming was used across the entire drive, is 256 GB, and assuming that the cyclic buffer partition(s) use 40 GB, then reserving 40 GB of the capacity for SLC programming would only provide a total capacity of 176 GB, which does not meet the customer's requirements. Accordingly, at least one embodiment of the present disclosure can provide the desired total capacity and endurance requirements by using different programming characteristics to program data associated with the cyclic buffer partition(s). Additional detail in this regard is provide with respect to FIG. 6.

An increased endurance expectation for the memory sub-system may be associated with increased write amplification. Write amplification is a process that occurs when writing data to solid state memory arrays. When randomly writing data in a memory array, the memory array scans for free space in the array. Free space in a memory array can be individual cells, pages, and/or blocks of memory cells that are not programmed. If there is enough free space to write the data, then the data is written to the free space in the memory array. If there is not enough free space in one location, the data in the memory array is rearranged by erasing, moving, and rewriting the data that is already present in the memory array to a new location leaving free space for the new data that is to be written in the memory array. The rearranging of old data in the memory array can be called write amplification because the amount of writing the memory arrays has to do in order to write new data is amplified based upon the amount of free space in the memory array and the size of the new data that is to be written on the memory array.

Figure 3:
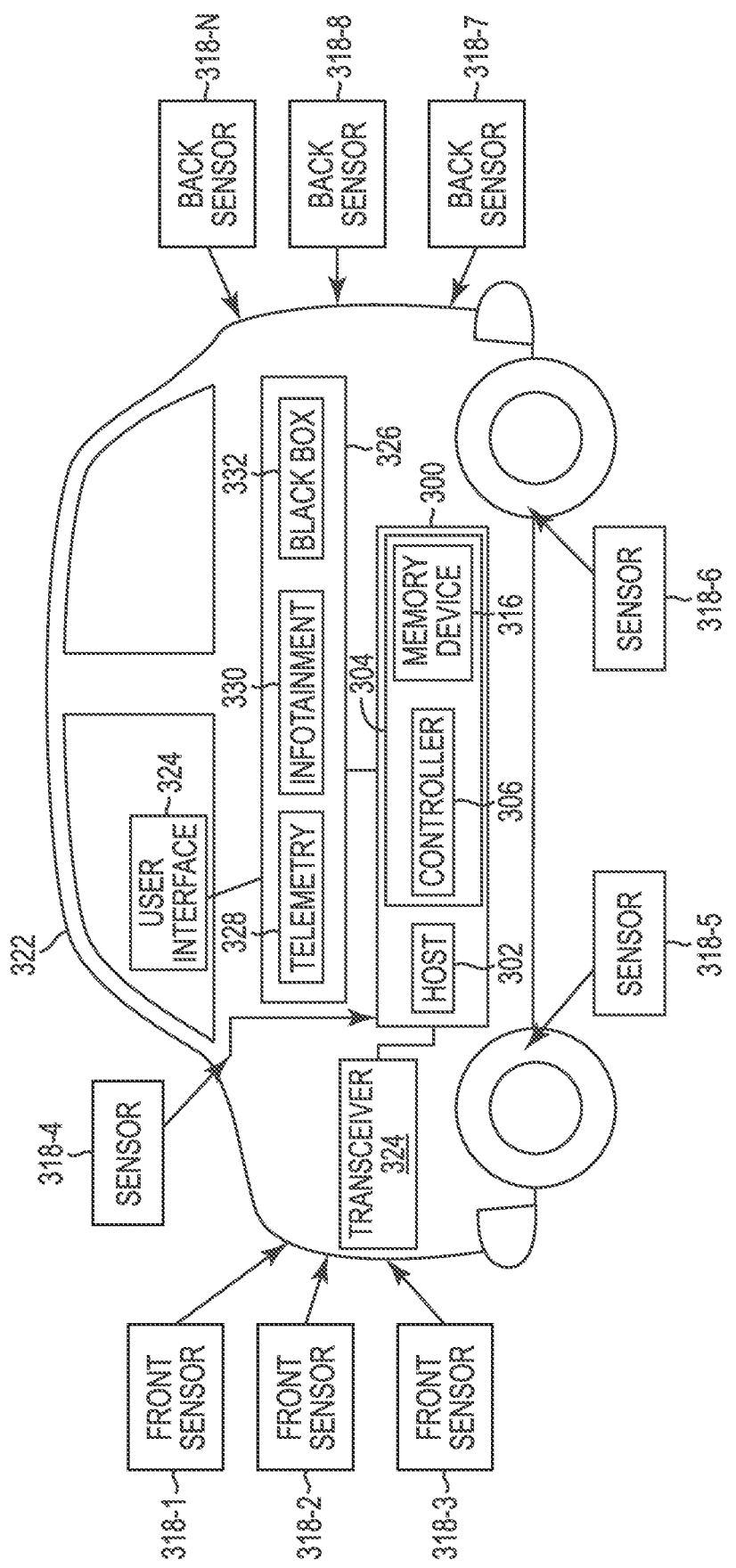
FIG. 3 illustrates an example of a system including a computing system in a vehicle in accordance with some embodiments of the present disclosure.

FIG. 3 illustrates an example of a system including a computing system 300 in a vehicle 322 in accordance with some embodiments of the present disclosure. The computing system 300 can include a memory sub-system 304, which is illustrated as including a controller 306 and non-volatile memory device 316 for simplicity but is analogous to the memory sub-system 104 illustrated in FIG. 1.

The computing system 300, and thus the host 302, can be coupled to a number of sensors 318 either directly, as illustrated for the sensor 318-4 or via a transceiver 324 as illustrated for the sensors 318-1, 318-2, 318-3, 318-5, 318-6, 318-7, 318-8, . . . , 318-N. The transceiver 324 is able to receive data from the sensors 318 wirelessly, such as by radio frequency communication. In at least one embodiment, each of the sensors 318 can communicate with the computing system 300 wirelessly via the transceiver 324. In at least one embodiment, each of the sensors 318 is connected directly to the computing system 300 (e.g., via wires or optical cables).

The vehicle 322 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 318 are illustrated in FIG. 3 as including example attributes. For example, sensors 318-1, 318-2, and 318-3 are cameras collecting data from the front of the vehicle 322. Sensors 318-4, 318-5, and 318-6 are microphone sensors collecting data from the from the front, middle, and back of the vehicle 322. The sensors 318-7, 318-8, and 318-N are cameras collecting data from the back of the vehicle 322. As another example, the sensors 318-5, 318-6 are tire pressure sensors. As another example, the sensor 318-4 is a navigation sensor, such as a global positioning system (GPS) receiver. As another example, the sensor 318-6 is a speedometer. As another example, the sensor 318-4 represents a number of engine sensors such as a temperature sensor, a pressure sensor, a voltmeter, an ammeter, a tachometer, a fuel gauge, etc. As another example, the sensor 318-4 represents a camera. Video data can be received from any of the sensors 318 associated with the vehicle 322 comprising cameras. In at least one embodiment, the video data can be compressed by the host 302 before providing the video data to the memory sub-system 304.

The host 302 can execute instructions to provide an overall control system and/or operating system for the vehicle 322. The host 302 can be a controller designed to assist in automation endeavors of the vehicle 322. For example, the host 302 can be an advanced driver assistance system (ADAS) controller, which may be referred to herein as an ADAS host 302. An ADAS can monitor data to prevent accidents and provide warning of potentially unsafe situations. For example, the ADAS can monitor sensors in the vehicle 322 and take control of vehicle 322 operations to avoid accident or injury (e.g., to avoid accidents in the case of an incapacitated user of a vehicle). The host 302 may need to act and make decisions quickly to avoid accidents. The memory sub-system 304 can store reference data in the non-volatile memory device 320 such that data from the sensors 318 can be compared to the reference data by the host 302 in order to make quick decisions.

The host 302 can write data received from one or more sensors 318 and store the data (e.g., in association with a black box application 332 for the vehicle). The black box application 332 may also be referred to as an accident data recorder. With the advent of autonomous vehicles, some autonomous driving requires real time buffering of telemetric data such as video cameras, radar, lidar, ultra-sonic and other sensors necessary to playback the sequences preceding an accident. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 302 can execute instructions to provide a set of applications 326 for the vehicle 322 including telemetry 328, infotainment 330, and a black box 332. The telemetry application 328 can provide information displayable on a user interface 334 such as may be associated with the instrumentation and/or dashboard of a vehicle 322. An example of such telemetric information is the speed at which the vehicle 322 is traveling (e.g., based at least in part on data from a sensor 318). The infotainment application 330 can include information and/or entertainment for a user of the vehicle 322 displayable or interfaced via the user interface 334. Examples of such information and/or entertainment include music, movies, GPS information such as a moving map, etc. The memory sub-system 304 can provide storage for any of the set of applications 326. The set of applications 326 can be virtualized, as described with respect to FIG. 1, with backing storage provided by the memory sub-system 304.

Figure 4:
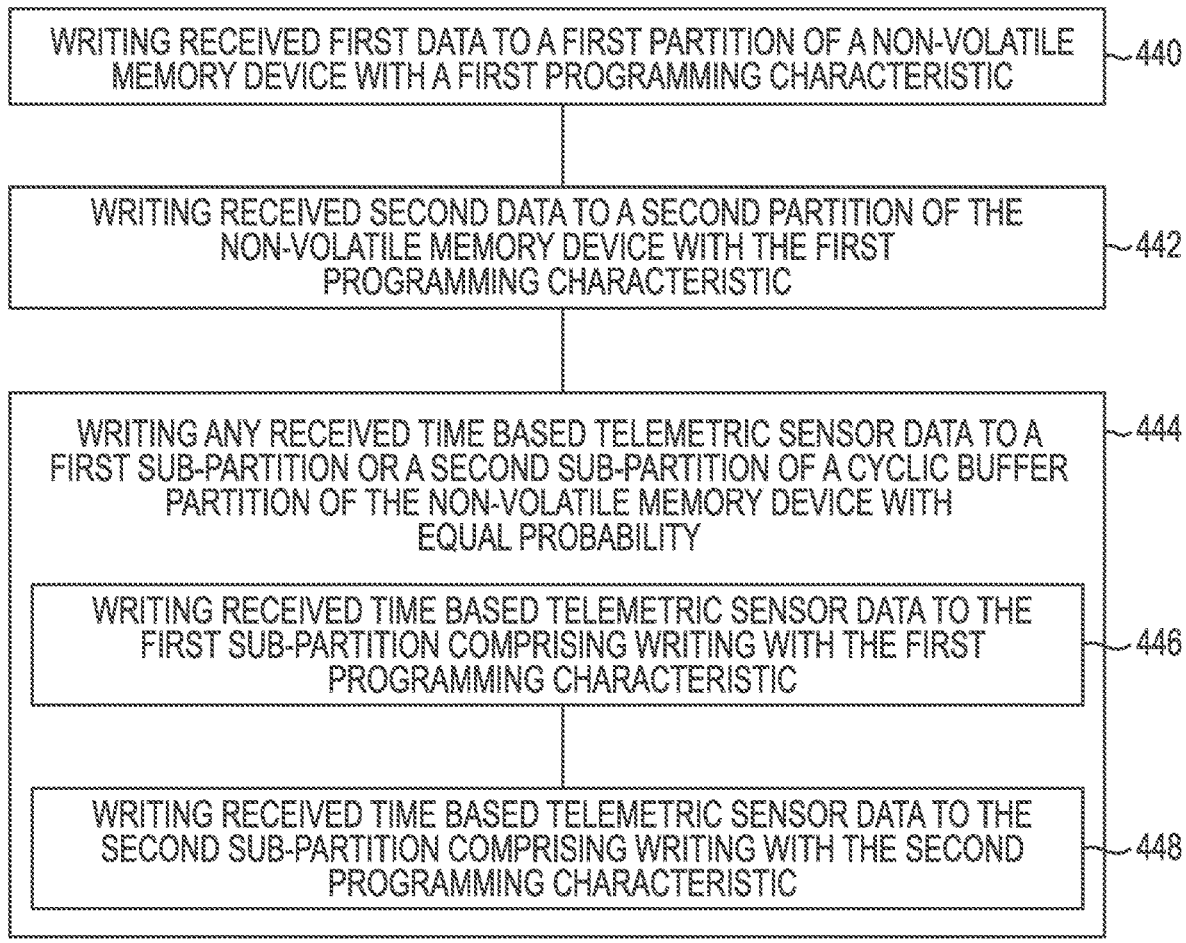
FIG. 4 is a flow diagram of an example method for partitions within buffer memory in accordance with some embodiments of the present disclosure.

FIG. 4 is a flow diagram of an example method for partitions within buffer memory in accordance with some embodiments of the present disclosure. At block 440 in the example method of FIG. 4, the method can include writing received first data to a first partition of a non-volatile memory device with a first programming characteristic. At block 442 in the example method of FIG. 4, the method can include writing received second data to a second partition of the non-volatile memory device with the first programming characteristic.

At block 444 in the example method of FIG. 4, the method can include writing any received time based telemetric sensor data to a first sub-partition or a second sub-partition of a cyclic buffer partition of the non-volatile memory device with equal probability. In some embodiments, the probability may be some non-equal predefined probability to allow for finer grained control over the balance between data density and endurance for specific implementations. As indicated at block 446 in the example method of FIG. 4, writing received time based telemetric sensor data to the first sub-partition can include writing with the first programming characteristic. As indicated at block 448 in the example method of FIG. 4, writing received time based telemetric sensor data to the second sub-partition can include writing with the second programming characteristic. In some embodiments, the method can be executed to provide backing storage for an ADAS.

The first programming characteristic can provide greater data density and lesser data endurance than the second programming characteristic. An example of the programming characteristics is a quantity of bits per cell stored in each memory cell that is programmed. The quantity of bits per cell is directly proportional to data density and inversely proportional to endurance. For example, the first programming characteristic can be programming more than one bit per memory cell and the second programming characteristic can be programming only one bit per memory cell.

Although not specifically illustrated, the method can include allocating a first plurality of memory blocks of the cyclic buffer partition as the first sub-partition and allocating a second plurality of memory blocks of the cyclic buffer partition as the second sub-partition. The method can include operating a first file system partition corresponding to the first partition of the non-volatile memory device, operating a second file system partition corresponding to the second partition of the non-volatile memory device, and operating a third file system partition corresponding to the cyclic buffer partition.

Figure 5:
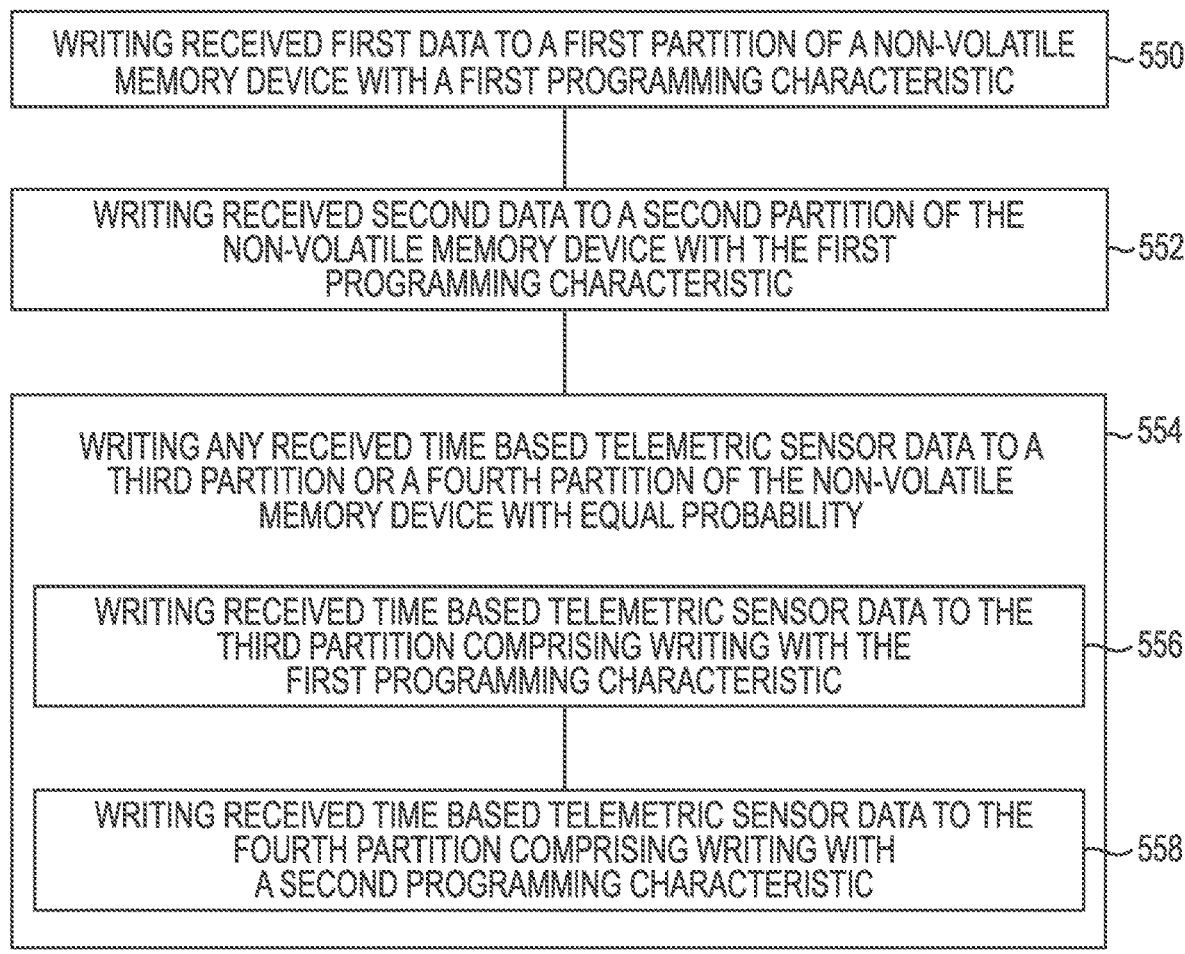
FIG. 5 is a flow diagram of an example method for partitions within buffer memory in accordance with some embodiments of the present disclosure.

FIG. 5 is a flow diagram of an example method for partitions within buffer memory in accordance with some embodiments of the present disclosure. At block 550 in the example method of FIG. 5, the method can include writing received first data to a first partition of a non-volatile memory device with a first programming characteristic. At block 552 in the example method of FIG. 5, the method can include writing received second data to a second partition of the non-volatile memory device with the first programming characteristic.

At block 554 in the example method of FIG. 5, the method can include writing any received time based telemetric sensor data to a third partition or a fourth partition of the non-volatile memory device with equal probability. In some embodiments, the probability may be some non-equal predefined probability to allow for finer grained control over the balance between data density and endurance for specific implementations. As indicated at block 556 in the example method of FIG. 5, writing received time based telemetric sensor data to the third partition can include writing with the first programming characteristic. As indicated at block 558 in the example method of FIG. 5, writing received time based telemetric sensor data to the fourth partition can include writing with the second programming characteristic. In some embodiments, the method can be executed to provide backing storage for an ADAS.

The second programming characteristic can provide lesser data density and greater data endurance than the first programming characteristic. Examples of the programming characteristics are described in more detail above. Although not specifically illustrated, the method can include operating a first file system partition corresponding to the first partition of the non-volatile memory device, operating a second file system partition corresponding to the second partition of the non-volatile memory device, and operating a third file system partition corresponding to the third partition and to the fourth partition of the non-volatile memory device. The third file system partition can be operated as a single logical volume.

The methods illustrated in FIG. 4 and FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system 104 and/or the memory sub-system controller 106 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 6:
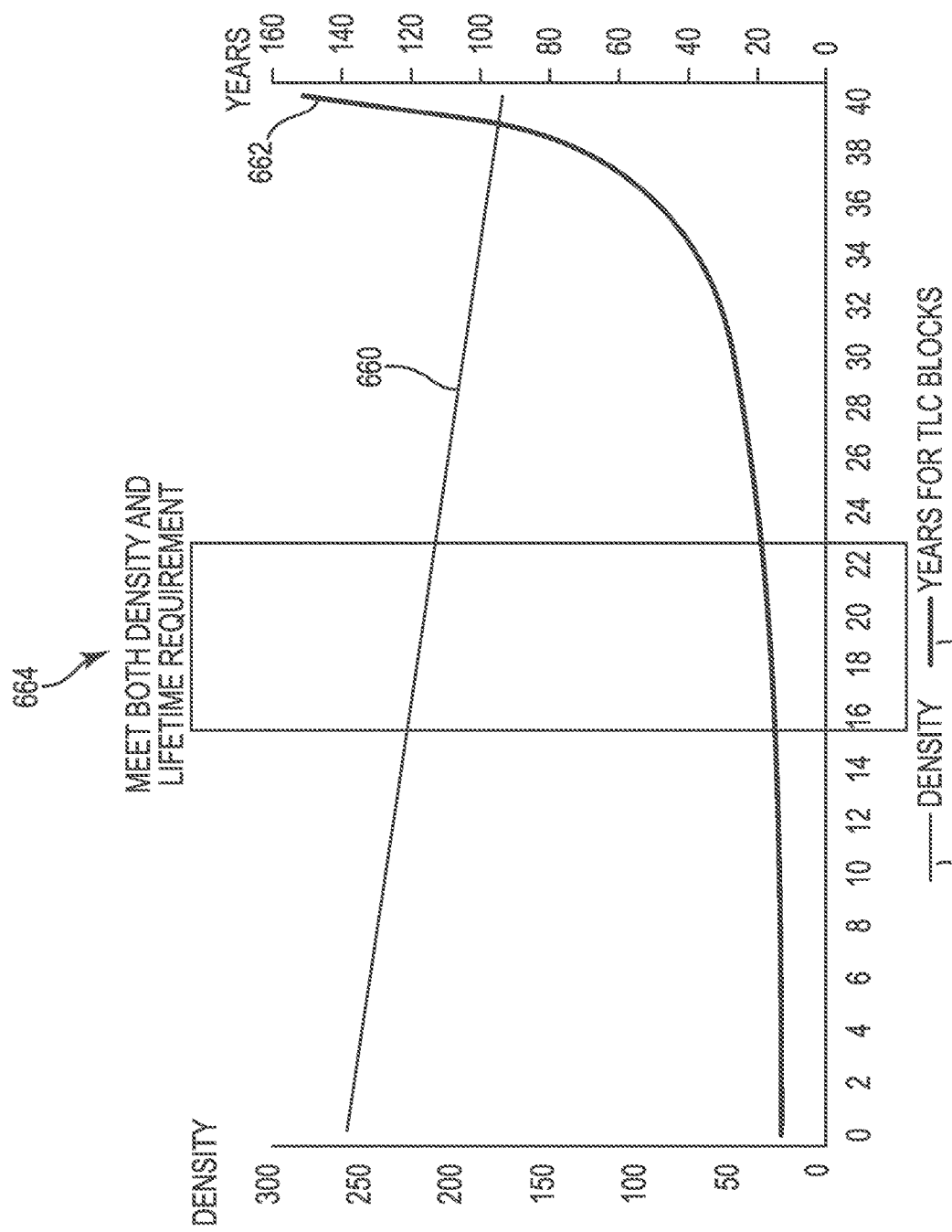
FIG. 6 is a graph of data density and endurance versus partition size in accordance with some embodiments of the present disclosure.

FIG. 6 is a graph of data density 660 and endurance 662 versus partition size in accordance with some embodiments of the present disclosure. The graph pertains to an example of a memory sub-system with a non-volatile memory (e.g., non-volatile memory 116 illustrated in FIG. 1) having a 256 GB capacity if the entire memory were operated with TLC programming. As described with respect to FIG. 2A and FIG. 2B, the non-volatile memory can store various data types for various file system partitions. In this example, for ease of illustration and explanation, it is assumed that data for all of the file system partitions and data types are stored with TLC programming, except for the cyclic buffer partition, as described herein. The variability in the graph represents different possible conditions that can exist as the data for the cyclic buffer partitioned is written with different combinations of SLC and TLC programming (from all TLC on the left to all SLC on the right).

The cyclic buffer partition can include one or more memory partitions. In some embodiments, the cyclic buffer partition can include a number of sub-partitions. With respect to FIG. 6, the cyclic buffer partition is generally considered one logical volume that is operated with two different programming characteristics (e.g., SLC programming and TLC programming). The horizontal axis on the bottom of the graph (from 0-40) represents the quantity of GB of the cyclic buffer partition that are operated with SLC programming. For example, if 40 GB of the cyclic buffer partition are operated with SLC programming, then the entire cyclic buffer partition is operated with SLC programming. If 0 GB of the cyclic buffer partition is operated with SLC programming, then the entire cyclic buffer partition is operated with TLC programming.

The vertical axis on the left of the graph labeled "density" represents the total capacity provided by the non-volatile memory device. The density 660 of the non-volatile memory is graphed linearly starting at 256 GB on the left, where the entirety of the cyclic buffer partition is written with TLC programming, to 176 GB on the right where the entirety of the cyclic buffer partition is written with SLC programming.

The vertical axis on the right of the graph labeled "years" represents the endurance (in years) for any memory blocks of the cyclic buffer partition that are written to with TLC programming. The endurance of the memory blocks written to with SLC programming is not illustrated and may be assumed to be sufficient in any case for purposes of this example. The endurance 662 of the TLC blocks is graphed as a curve indicating increased endurance as fewer blocks are written with TLC programming.

The following table shows a breakdown of the types of data "file type", programming characteristics "partition type" with which the corresponding type of data is written, the data size in GB, and an indication of the write frequency in GB/year, with respect to this example:

TABLE 1

| File Type | Partition Type | Data size (GB) | Write GB/year |
|---|---|---|---|
| Boot | TLC | .017 | .08 |
| OS | TLC | 30 | 55 |
| Map Data | TLC | 50 | 100 |
| Speech Data | TLC | 15 | 10 |
| Application Data | TLC | 30 | 10 |
| Sensor Data | SLC & TLC | 40 | 16,000 |
| OTA | TLC | 35 | 250 |
| Logs | TLC | 10 | 250 |

In this example, assume that the ratio of SLC size:TLC size=x:y. It may also be assumed that data is written in with SLC programming and TLC programming with equal probability because data for the cyclic buffer partition is written in a loop. The write SLC size is therefore:

$$\frac{x}{x+y} * 16,000 * 15$$

The write TLC size is therefore:

$$\frac{x}{x+y} * 16,000 * 15 + 675.08 * 15$$

where 16,000 is the write frequency in GB/year, 15 is the minimum endurance requirement in years, and 675.08 is the total write GB/year (aside from the sensor data). In this example, x=y=40 GB. The SLC endurance estimation is:

$$x * \frac{\frac{40K}{WA(SLC)}}{\frac{x}{40} * 16,000} = 95 \text{ years}$$

where WA(SLC) is the write amplification for SLC programming, which is very small (e.g., 1.05) with sequential writes and 40 K=40,000 program-erase cycles. This 95 year estimate is reflected on the graph where the density line 660 intersects the endurance line 662 near the right side of the graph.

TLC programming may be considered to be the worst case condition for endurance in this example. For TLC programming, it can be assumed that WA(TLC)=4. As the SLC size for time based telemetric sensor data is increased, the total density of the device is decreased. As the SLC size for time based telemetric sensor data is increased, the endurance of the non-volatile memory device is increased. This balance can be adjusted to provide desired endurance and data density goals (e.g., per customer requirements).

In this example, the minimum endurance requirement is 15 years and the minimum density (capacity) is 210 GB. For the endurance requirement, anything to the right of the 15 year mark on the horizontal axis would be acceptable. This is indicated by the left side of the window 664 overlaid on the graph. For the density requirement, anything to the left of the point where the density line 660 it at 210 GB on the right vertical axis would be acceptable. This is indicated by the right side of the window 664 overlaid on the graph. The specific numbers and requirements illustrated and described with respect to FIG. 6 are just examples to illustrate embodiments of the present disclosure and should not be taken in a limiting sense.

A set of instructions, for causing a machine to perform one or more of the methodologies discussed herein, can be executed. The instructions can be executed by a processing device (e.g., one or more general-purpose processing devices such as a microprocessor, a central processing unit, or the like). More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device can also be one or more special-purpose processing devices such as an ASIC, an FPGA, a digital signal processor (DSP), network processor, or the like. The processing device is configured to execute instructions for performing the operations and steps discussed herein. In some embodiments, the instructions can be communicated over a network interface device to communicate over a network.

A machine-readable storage medium (also known as a computer-readable medium) can store one or more sets of instructions or software embodying one or more of the methodologies or functions described herein. The instructions can also reside, completely or at least partially, within main memory and/or within a processing device during execution thereof by a computing system. The main memory and the processing device can also constitute machine-readable storage media.

The term "machine-readable storage medium" should be taken to include a single medium or multiple media that store the one or more sets of instructions. The term "machine-readable storage medium" should also be taken to include a medium that is capable of storing or encoding a set of instructions for execution by the machine and that cause the machine to perform one or more of the methodologies of the present disclosure. The term "machine-readable storage medium" should accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory apparatus, comprising:
   a non-volatile memory device, comprising:
      a first partition;
      a second partition; and
      a cyclic buffer partition; and
   a memory controller coupled to the non-volatile memory device, wherein the memory controller is configured to:
      allocate a first plurality of memory blocks of the cyclic buffer partition as a first sub-partition;
      allocate a second plurality of memory blocks of the cyclic buffer partition as a second sub-partition;
      write received first time based telemetric sensor data to the first sub-partition with a first programming characteristic;
      write received second time based telemetric sensor data to the second sub-partition with a second programming characteristic;
      write received first data to the first partition with the first programming characteristic, wherein the first data comprises operating system image data; and write received second data to the second partition with the first programming characteristic, wherein the second data comprises application data.

2. The memory apparatus of claim 1, wherein the first programming characteristic provides greater data density and lesser data endurance than the second programming characteristic.

3. The memory apparatus of claim 2, wherein the second programming characteristic comprises single level cell programming.

4. The memory apparatus of claim 1, wherein the memory controller is configured to write any received time based telemetric sensor data to the first sub-partition or the second sub-partition with equal probability.

5. The memory apparatus of claim 1, further comprising a host coupled to the memory controller, wherein the host is configured to:
    operate a first file system partition corresponding to the first partition of the non-volatile memory device;
    operate a second file system partition corresponding to the second partition of the non-volatile memory device; and
    operate a third file system partition corresponding to the cyclic buffer partition.

6. The memory apparatus of claim 5,
    wherein the application data includes map data;
    wherein the host comprises an advanced driver assistance system controller; and
    wherein the memory controller and the non-volatile memory device comprise a solid state drive.

7. The memory apparatus of claim 1, wherein the non-volatile memory device comprises a plurality of additional partitions.

8. A memory apparatus, comprising:
    a non-volatile memory device, comprising:
        a first partition;
        a second partition;
        a third partition; and
        a fourth partition; and
    a memory controller coupled to the non-volatile memory device, wherein the memory controller is configured to:
        write received first data to the first partition with a first programming characteristic, wherein the first data comprises operating system image data;
        write received second data to the second partition with the first programming characteristic, wherein the second data comprises application data;
        write received first time based telemetric sensor data to the third partition with the first programming characteristic; and
        write received second time based telemetric sensor data to the fourth partition with a second programming characteristic that provides lesser data density and greater data endurance than the first programming characteristic.

9. The memory apparatus of claim 8, wherein the memory controller is configured to write any received time based telemetric sensor data to the third partition or the fourth partition with equal probability.

10. The memory apparatus of claim 8, wherein the second programming characteristic comprises single level cell programming.

11. The memory apparatus of claim 8, further comprising a host coupled to the memory controller, wherein the host is configured to:
    operate a first file system partition corresponding to the first partition of the non-volatile memory device;
    operate a second file system partition corresponding to the second partition of the non-volatile memory device; and
    operate a third file system partition, corresponding to the third partition and to the fourth partition of the non-volatile memory device, as a single logical volume.

12. The memory apparatus of claim 11,
    wherein the application data includes infotainment data;
    wherein the host comprises an advanced driver assistance system controller; and
    wherein the memory controller and the non-volatile memory device comprise a solid state drive.

13. The memory apparatus of claim 8, wherein the non-volatile memory device comprises an additional partition including a plurality of sub-partitions.

14. A method for operating memory, comprising:
    writing received first data to a first partition of a non-volatile memory device with a first programming characteristic, wherein the first data comprises operating system image data;
    writing received second data to a second partition of the non-volatile memory device with the first programming characteristic, wherein the second data comprises application data; and
    writing any received time based telemetric sensor data to a first sub-partition or a second sub-partition of a cyclic buffer partition of the non-volatile memory device with equal probability, wherein:
        writing received time based telemetric sensor data to the first sub-partition comprising writing with the first programming characteristic; and
        writing received time based telemetric sensor data to the second sub-partition comprising writing with the second programming characteristic.

15. The method of claim 14, further comprising allocating a first plurality of memory blocks of the cyclic buffer partition as the first sub-partition; and
    allocating a second plurality of memory blocks of the cyclic buffer partition as the second sub-partition.

16. The method of claim 14, wherein the first programming characteristic provides greater data density and lesser data endurance than the second programming characteristic.

17. The method of claim 14, wherein writing received first data, received second data, and received time based telemetric sensor data comprises providing backing storage for an advanced driver assistance system.

18. The method of claim 14, further comprising operating a first file system partition corresponding to the first partition of the non-volatile memory device;
    operating a second file system partition corresponding to the second partition of the non-volatile memory device; and
    operating a third file system partition corresponding to the cyclic buffer partition.

19. A method for operating memory, comprising:
    writing received first data to a first partition of a non-volatile memory device with a first programming characteristic, wherein the first data comprises operating system image data;
    writing received second data to a second partition of the non-volatile memory device with the first programming characteristic, wherein the second data comprises application data; and
    writing any received time based telemetric sensor data to a third partition or a fourth partition of the non-volatile memory device with equal probability, wherein:

writing received time based telemetric sensor data to the third partition comprising writing with the first programming characteristic; and writing received time based telemetric sensor data to the fourth partition comprising writing with a second programming characteristic.

20. The method of claim 19, wherein the second programming characteristic provides lesser data density and greater data endurance than the first programming characteristic.

21. The method of claim 19, further comprising operating a first file system partition corresponding to the first partition of the non-volatile memory device;

operating a second file system partition corresponding to the second partition of the non-volatile memory device; and operating a third file system partition, corresponding to the third partition and to the fourth partition of the non-volatile memory device.

22. The method of claim 21 further comprising operating the third file system partition as a single logical volume.

23. The method of claim 21, wherein writing received first data, received second data, and received time based telemetric sensor data comprises providing backing storage for an advanced driver assistance system.

* * * * *